United States Patent [19]

Hiasa et al.

[11] Patent Number: 5,607,595
[45] Date of Patent: Mar. 4, 1997

[54] PROCESS FOR PURIFYING WATER

[75] Inventors: Masami Hiasa; Nobuyuki Ashie; Susumu Saito; Takayuki Ohtani, all of Kita-kyushu, Japan

[73] Assignee: Toto Ltd., Japan

[21] Appl. No.: 338,493

[22] PCT Filed: Mar. 30, 1994

[86] PCT No.: PCT/JP94/00518

§ 371 Date: Dec. 20, 1994

§ 102(e) Date: Dec. 20, 1994

[87] PCT Pub. No.: WO95/00442

PCT Pub. Date: Jan. 5, 1995

[30] Foreign Application Priority Data

Mar. 31, 1993 [JP] Japan .................................... 5-098866

[51] Int. Cl.$^6$ ...................................................... C02F 1/28
[52] U.S. Cl. ........................ 210/669; 210/672; 210/694
[58] Field of Search .................................. 210/669, 670, 210/694, 184–186, 266, 282, 449, 502.1, 672

[56] References Cited

U.S. PATENT DOCUMENTS 3,909,402  9/1975  Gartner ..................................... 210/669
5,324,434  6/1994  Oikawa et al. ........................... 210/266

FOREIGN PATENT DOCUMENTS 49-70450   7/1974   Japan .
57-11629   3/1982   Japan .
58-146595  10/1983  Japan .
58-180228  10/1983  Japan .
60-225641  11/1985  Japan .
63-62591   3/1988   Japan .
476751     12/1992  Japan .

OTHER PUBLICATIONS

Chemical Engineering, 1984, vol. 29, No. 7, Japanese.

*Primary Examiner*—Ivars Cintins
*Attorney, Agent, or Firm*—Lorusso & Loud

[57] ABSTRACT

A process and device for purifying water of the type wherein activated carbon is subjected to regeneration. Tap water is contacted with activated carbon fibers characterized by a narrow micropore distribution and a high adsorption speed, to eliminate by adsorption residual chlorine, harmful trihalomethane compounds and smelly substances such as 2-methylisoborneol and geosmin that are present in tap water. Activated carbon fibers having a modal micropore diameter of about 1.8–3.0 nm, preferably, 2.0–2.7 nm, are used to cause the large-molecular-weight smelly substances to be intensively and selectively adsorbed by the activated carbon fibers. In non-use, the activated carbon fibers are occasionally heated at a temperature of 100°–120° C. whereby trihalomethane compounds adsorbed in the activated carbon fibers are desorbed so that the adsorption capability of activated carbon fibers with respect to trihalomethanes is restored. Accordingly, trihalomethanes as well as smelly substances can be eliminated for a long period without requiring replacement of activated carbon fiber cartridge, while using a limited amount of activated carbon fibers.

16 Claims, 11 Drawing Sheets

PROCESS FOR PURIFYING WATER

TECHNICAL FIELD

The present invention relates to a process and device for purifying tap or city water.

BACKGROUND ART

As tap or city water has been subjected to chlorination with chlorine gas or sodium hypochlorite, it contains residual chlorine dissolved in the form of hypochlorous ion (ClO$^-$) or hypochlorous acid (HClO). Such residual chlorine gives rise to a smell which is commonly referred to as bleaching powder odor and is often unwelcome. Tap water also contains a small amount of organic chlorine compounds, including trihalomethane compounds such as chloroform $CHCl_3$ and bromodichloromethane $CHCl_2Br$, which are produced by reaction of chlorine with organic substances. The presence of trihalomethane compounds in tap water is drawing increasing public attention as they are carcinogenic, harmful substances. Furthermore, in recent years, phytoplanktons tend to increase and propagate in water sources due to water pollution and eutrophication, so that smelly or malodorous organic substances which presumably are metabolite or secreta of phytoplanktons are present in a small content in tap water. Known in the art as such plankton-originated smelly substances are 2-methylisoborneol $C_{11}H_{20}O$ (hereinafter, 2-MIB) and geosmin $C_{12}H_{22}O$. These substances are generally referred to as "musty-smelling" substances because of their musty odor and are likewise unwelcome.

Conventionally, water purifying devices have been used for domestic or business purposes in order to remove these harmful and smelly substances from tap water to obtain healthful and palatable water. In early water purifiers, it has been customary to use granular activated charcoal which is capable of removing residual chlorine as well as, although only for a limited period of time, trihalomethanes and smelly organic substances. It is believed that residual chlorine is removed by chemical adsorption at the active sites (C—O$^-$ bond) located at the surface of activated charcoal. Accordingly, the adsorption capability of granular activated charcoal with respect to residual chlorine is deemed to be dependent on the specific surface area of activated charcoal. In contrast, trihalomethanes and smelly organic substances are believed to be physically adsorbed by activated charcoal, with the hydrated molecules thereof being trapped in the micropores of activated charcoal.

Once residual chlorine (hypochlorous ion or hypochlorous acid) is removed by bringing tap water in contact with activated charcoal, bacteria may be allowed to breed at the activated charcoal when the water purifier is out of use. As this is unhygienic, it has therefore been proposed in the art to subject the activated charcoal to sterilization by boiling it at a temperature of 100°–150° C. to kill bacteria (e.g., Japanese Patent Kokai Publication Nos. 49-70450 and 63-62591). Advantageously, heating of activated charcoal causes trihalomethanes to be desorbed from the micropores of activated charcoal and purged into the atmosphere, because of chloroform having a boiling point of 61.2° C. and bromodichloromethane having a boiling point of 90.1° C. It is considered that heating also results in dissociation of the C—O$^-$ bond at the surface of activated charcoal to revive the active sites. Accordingly, activated charcoal is regenerated in this manner with respect to trihalomethanes as well as residual chlorine so that the service life thereof is extended. However, 2-MIB and geosmin can hardly be purged by boiling because they have a molecular weight (168 and 182, respectively) larger than that of trihalomethane and, hence, have a boiling point (208° C. and 254° C., respectively) higher than that of water.

Apart from the possibility of sterilization and regeneration achieved by boiling, from a point of view that chlorine-originating trihalomethanes as well as plankton-originated smelly substances (mainly 2-MIB and geosmin) are to be removed thoroughly for a prolonged period of time, the adsorption capability of granular activated charcoal as performed by the "physical" adsorption by the micropores is considered insufficient for the following two reasons.

First, it is believed that, for a substance to be adsorbed by activated carbon by way of the physical adsorption process, an optimum micropore diameter exists which varies from substance to substance. However, the micropore diameter distribution of granular activated charcoal is generally unsuitable to selectively adsorb a given particular substance. To explain with reference to the graphs of FIGS. 1 and 2, the graph of FIG. 1 illustrates the cumulative micropore volume (measured by the nitrogen adsorption method and analyzed by the Cranston and Inkley method for diameter less than 150 Å; measured by the mercury penetration method for diameter equal to or greater than 150 Å) of three kinds of granular activated charcoal A-C available on the market. The graph of FIG. 2 shows the cumulative micropore diameter V of FIG. 1 as differentiated by the micropore diameter D to see the micropore diameter distribution of the granular activated charcoal. It will be noted from the graphs of FIGS. 1 and 2 that granular activated charcoal has a micropore diameter which is distributed over an extremely wide range. This means that granular activated charcoal is suitable to comprehensively adsorb a wide variety of substances having various particle size varying from small to large one but, as a corollary thereof, is not suitable to center the target of adsorption at a particular substance.

More specifically, to discuss the adsorption capability with respect to trihalomethanes and smelly substances, because granular activated charcoal has a substantial amount of micropores having such a pore diameter that is capable of adsorbing those substances having a particle size different from that of trihalomethanes and smelly substances, the adsorption capacity thereof available for adsorption of trihalomethanes and smelly substances is limited to the extent that it possesses additional adsorption capacity capable of adsorbing substances other than trihalomethanes and smelly substances. Accordingly, from the view point that the target is to be directed on trihalomethanes and smelly substances thereby to remove them intensively and selectively, the adsorption capability afforded by granular activated charcoal cannot but be fully utilized. This means that the service life of granular activated charcoal with respect to these substances—target substances—is short.

Second problem is associated with the adsorption speed of granular activated charcoal. Although the micropore structure of granular activated charcoal is not known with any certainty, it is believed that, in view of the pore diameter distribution shown in FIG. 2, granular activated charcoal has a micropore structure as shown in the model of FIG. 3 (Ishizaki, Fibrous Activated Carbon and its Application, Chemical Engineering, July 1984, FIG. 7). As the micropores of granular activated charcoal extend in an intricate manner into the mass as shown, a substantial time is required for any substance to access the inner part of micropores. Consequently, granular activated charcoal has a slow adsorption speed. As a result, a considerable time of contact is necessary to ensure that those substances, such as trihalomethanes and smelly substances, which are present in tap water only in a small concentration are fully adsorbed.

For these reasons, water purifiers employing granular activated charcoal requires either use of a large amount of activated charcoal or frequent replacement of activated charcoal. Use of large amount of activated charcoal is unfavorable because it necessitates to increase the size of the water purifiers. As water purifiers whether of domestic or business use are used in a crowded environment such as a kitchen, it is desirable that the size thereof be as small as possible.

In recent water purifiers, activated carbon fibers manufactured by carbonizing acrylic or phenolic fibers followed by activation have been increasingly used because of the improved adsorption speed thereof as compared with granular activated charcoal and due to the advantage of having a narrower pore diameter distribution. In this instance, also, typical water purifiers marketed today are designed such that cartridges of activated carbon fibers are replaced a each six months or a year, because the amount of activated carbon fibers that can be charged in compact water purifiers is similarly limited. Accordingly, periodical replacement of cartridges is still required so that a substantial running cost is incurred to purchase the carbon fiber cartridges which are highly expensive.

It has been proposed in the art to regenerate activated carbon fibers by using steam (Japanese Utility Model Kokai Publication No. 55-39095; Japanese Patent Kokai Publication No. 60-225641). However, since 2-MIB and geosmin of plankton-originated smelly substances respectively have a boiling point which is notably higher than that of water as mentioned before, regeneration of the adsorption capability with respect to these substances is not effective at all if regeneration by steam is carried out under the atmospheric pressure. Japanese Patent Kokai Publication No. 61-42394 proposes to regenerate activated carbon fibers at a temperature of 100°–200° C. by using pressurized or superheated steam. This method, although applicable to water treatment of an industrial scale, is difficult to apply to water purifiers for domestic or business use, because it entails a high electric power consumption and a high pressure adsorption vessel design in order to penetrate high-pressure steam superheated at such a high temperature that is capable of evaporating and purging 2-MIB and geosmin.

There has also been proposed to regenerate activated carbon fibers by heating them in air at a temperature of 350°–400° C. (Japanese Utility Model Kokai Publication No. 58-146595). However, as activated carbon fibers generally comprise extremely fine fibers of 5–20 micrometers in diameter so that they are readily burned and broken into pieces by thermal degradation when heated in air, it is undesirable to heat them at such a high temperature that 2-MIB and geosmin are evaporated.

DISCLOSURE OF THE INVENTION

The object of the present invention is to provide a process and device for purifying water which is capable of effectively removing, for a prolonged period of time, chlorination-originating organic chlorine compounds as well as water source microorganism-originating smelly substances that are present in tap water, yet using a limited amount of activated carbon fibers.

Another object of the invention is to provide a process and device for purifying water which is capable of effectively removing, for a prolonged period of time and by using a limited amount of activated carbon fibers, harmful substances such as trihalomethane compounds which are present in tap water as well as those substances, such as 2-MIB and geosmin, which have a high boiling point and, hence, are difficult to desorb.

A still another object of the invention is to provide a water purifier which is compact in size and which is capable of effectively removing chlorination-originating organic chlorine compounds as well as water source microorganism-originating smelly substances that are present in tap water in a very low concentration.

A further object of the invention is to provide a process and device for purifying water which is capable of effectively removing harmful substances such as trihalomethane compounds as well as smelly substances such as 2-MIB and geosmin and which have a prolonged service life of activated carbon fibers and are operable at a low running cost without requiring replacement of activated carbon fibers for years.

The present invention is based on:

1) a concept that, in order to effectively purify tap water for a long period while using a limited amount of activated carbon fibers, the objective or target of adsorption must be centered toward smelly substances, such as 2-MIB and geosmin, which are difficult to desorb at the normal boiling temperature of water because of their large molecular weight and, to this end, those activated carbon fibers which are capable of adsorbing as large an amount of smelly substances as possible (i.e., which have a large adsorption capacity for these substances) must primarily be used, thereby to prolong as far as possible the service life of activated carbon fibers with respect to smelly substances without recourse to regeneration—selective adsorption of smelly substances—, 2) a finding that activated carbon fibers which are most suitable to selectively adsorb a large amount of a substance having a molecular weight of 160–190 are those activated carbon fibers which have a modal micropore diameter, to be defined later with reference to FIG. 4, of about 1.8–3.0 nm, preferably, 2.0–2.7 nm, as measured by the steam adsorption method—optimization of the modal micropore diameter of activated carbon fibers—, 3) a finding that activated carbon fibers which are adapted to selectively adsorb a large molecular weight substance such as 2-MIB and geosmin yet possess an adsorption capability enough to temporarily adsorb a small amount of trihalomethane compounds of a smaller molecular weight—the possibility of temporary adsorption for trihalomethanes—, and, 4) a concept that the service life of activated carbon fibers with respect to trihalomethanes can be extended long enough to sustain continued use over years, provided that the adsorption capability thereof with respect to trihalomethanes, although limited in amount as above mentioned, is restored from time to time by heating—regeneration of the adsorption capability of activated carbon fibers with respect to trihalomethanes—.

Based on the above concepts and findings, the feature of the device and process for purifying water according to the present invention is that activated carbon fibers having a modal micropore diameter, measured by the steam adsorption method, of about 1.8–3.0 nm, preferably, about 2.0–2.7 nm, are primarily used to ensure that, upon bringing tap water in contact with activated carbon fibers, a smelly substance being present in tap water and having a molecular weight of about 160–190 is selectively adsorbed by activated carbon fibers as well as to ensure at the same time that a trihalomethane compound having smaller molecular weight is temporarily adsorbed thereby, the activated carbon fibers, when they are out of use, being occasionally heated at a temperature higher than the boiling point of trihalomethane compound, preferably, higher than the boiling point of water, but lower than the boiling point of the smelly substance, to cause the thus adsorbed trihalomethane compound to be desorbed from activated carbon fibers, thereby to regenerate the adsorption capability of activated carbon fibers with respect to the trihalomethane compound.

As in this manner an adequate adsorption capacity has been reserved from the outset for the smelly substance of a large molecular weight by making use of activated carbon fibers having a modal micropore diameter of about 1.8–3.0 nm, preferably, about 2.0–2.7 nm, the smelly substance can be adsorbed, under the normal water quality condition, for a long period attaining to 4–7 years without replacement of activated carbon fibers even though the water purifier is designed sufficiently small and compact, whereby the service life of activated carbon fibers with respect to the smelly substance is remarkably prolonged.

With regard to the removal of trihalomethanes, the adsorption capability of activated carbon fibers with respect to trihalomethanes can be satisfactorily sustained throughout the intended service life thereof assigned to the smelly substance (preferably, 4–7 years), due to the fact that activated carbon fibers having a modal micropore diameter of about 1.8–3.0 nm yet have an adsorption capability sufficient to temporarily adsorb a small amount of trihalomethanes, in combination with the fact that trihalomethanes can be readily evaporated by heating because of their low boiling point so that the adsorption capability with respect to trihalomethanes may be revived from time to time.

In this way, the adsorption capability provided by activated carbon fibers is utilized in two aspects; the aspect that, with respect to the smelly substances which are difficult to desorb by heating, an adequate adsorption capacity (i.e., micropore volume) can be reserved by optimization of the micropore diameter of activated carbon fibers, and the aspect that, regarding trihalomethane compounds which may be readily desorbed by heating, a practically satisfactory adsorption can be achieved by repeating regeneration of activated carbon fibers. As the adsorption capability of activated carbon fibers is fully utilized in this manner, both trihalomethanes and smelly substances are effectively removed for a prolonged period with a limited amount of activated carbon fibers.

Activated carbon fibers usable in the present invention may be obtained from various manufacturers. The present inventors believe that the activated carbon fibers "FT-25" and "FT-20" available from Kuraray Chemical Co., Ltd. of Bizen City, Okayama, Japan and the activated carbon fibers "A-20" marketed by Osaka Gas Co., Ltd. of Osaka City, Japan may be suitably used.

The activated carbon fibers "FT-25" have micropore characteristics as shown in the graph of FIG. 4, wherein the ordinate indicates the cumulative micropore volume V and the abscissa represents the micropore diameter in the logarithmic scale. In the graph, the cumulative micropore volume V as measured by the steam adsorption method is shown by the solid line curve. The dotted line curve is intended to show the micropore diameter distribution of the activated carbon fibers and represents the cumulative micropore volume V, shown by the solid line curve, as differentiated by the micropore diameter D. Accordingly, for the micropore diameter distribution, the ordinate represents $\Delta V/\Delta \log D$. It will be noted from the dotted line curve that the micropore diameter distribution of "FT-25" presents a peak at a particular micropore diameter so that the rate at which the micropores of a given diameter occupy in the cumulative micropore volume becomes highest at that particular diameter. The term "modal micropore diameter" as used in the present specification and the appended claims is intended to mean the micropore diameter D that corresponds to the peak mentioned above. Although the cross-sectional configuration of micropores is not always true circular, the term "diameter" herein is used to indicate the transversal size thereof according to the customary usage in the art. It will be noted from the graph that "FT-25" has a modal micropore diameter of about 2.7 nm. It will also be noted that, in the activated carbon fibers under question, the volume that is occupied by the micropores having a diameter of from 2.4 nm to 3.0 nm is roughly 0.4 ml/g.

The present inventors have observed that the activated carbon fibers having a modal micropore diameter of about 2.7 nm is suitable to selectively adsorb the plankton originated smelly substances, particularly, 2-MIB. Presumably, this is because the diameter of the molecules of 2-MIB is enlarged by hydration so that the hydrated molecules are accommodated to the micropore diameter of activated carbon fibers.

Activated carbon fibers in the form of non-woven fabric may be used. In the case that the water purifier is intended for domestic use to purify tap water at a maximum flow rate of about 5 l/min for 4–7 years without replacement of activated carbon fibers, about 40–70 g of activated carbon fibers may be charged in the processing vessel. In order to decrease any load that may be imposed by suspended particulate upon activated carbon fibers so as to prolong the service life of activated carbon fibers, it is preferable that a filtration stage comprised of a filter such as hollow fiber membrane filter is provided upstream of the processing vessel to preliminarily remove any particulate components such as ferrous rust in tap water.

The processing vessel charged with activated carbon fibers may be heated at a temperature higher than the boiling point of trihalomethanes, preferably, at a temperature higher than the boiling point of water, for example, at a temperature of 100°–120° C., to regenerate the activated carbon fibers as required. Heating may be carried out periodically when the water purifier is out of use and is preferably performed automatically every night for about 60 minutes by an electric heater controlled by a timer. As water in the processing vessel is heated to the boil, the activated carbon fibers undergo sterilization and trihalomethanes so far adsorbed by activated carbon fibers are desorbed therefrom so that the activated carbon fibers are regenerated with respect to trihalomethanes.

BEST MODE FOR CARRYING OUT THE INVENTION

First, the concept and principle of the present invention will be described in more detail with reference to Examples 1 and 2.

EXAMPLE 1

Figure 1:
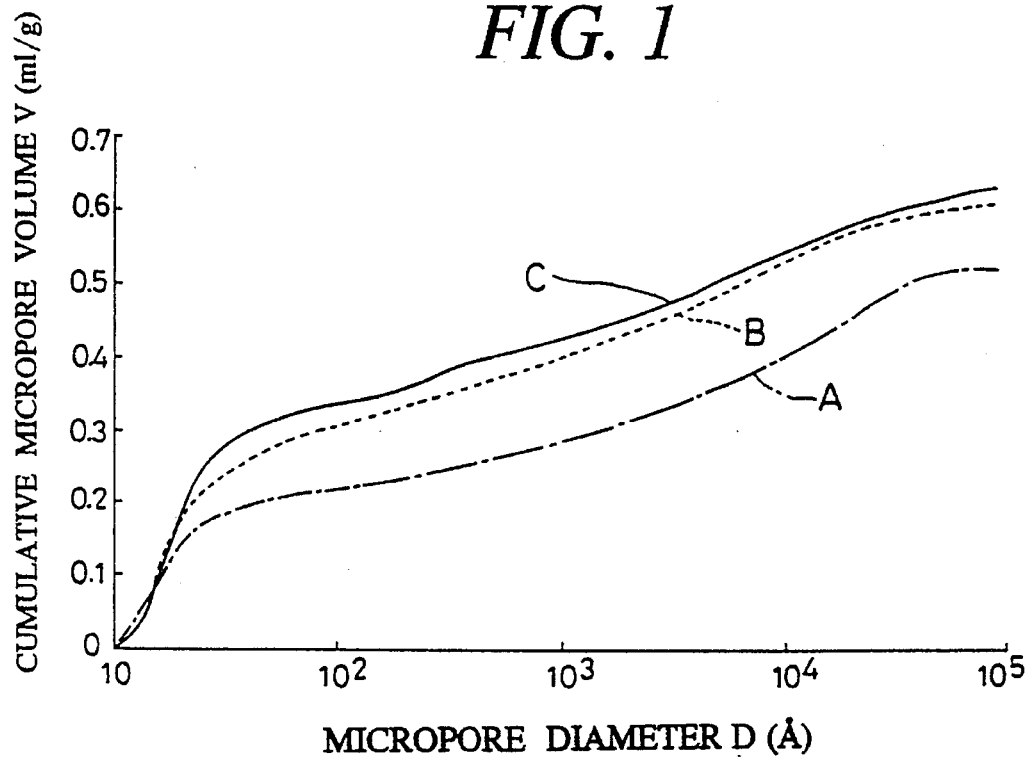
FIG. 1 is a graph showing the cumulative micropore volume of granular activated charcoal.
Figure 2:
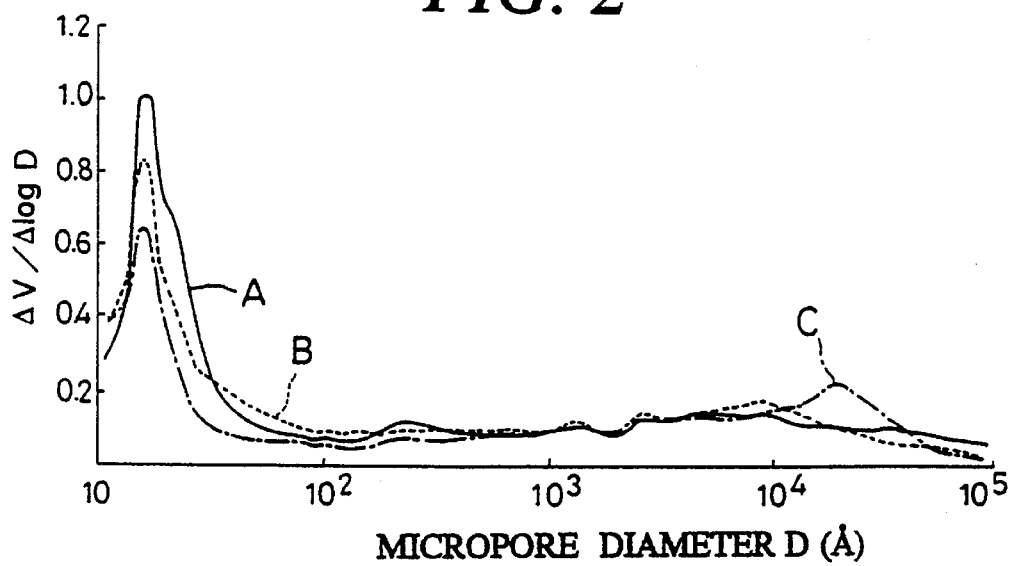
FIG. 2 is a graph showing the cumulative micropore volume of FIG. 1 as differentiated by the micropore diameter to illustrate the micropore diameter distribution.
Figure 3:
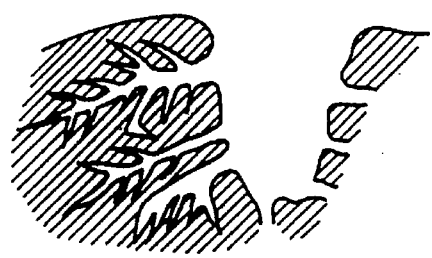
FIG. 3 is a schematic view showing the model of micropore structure of granular activated charcoal.
Figure 4:
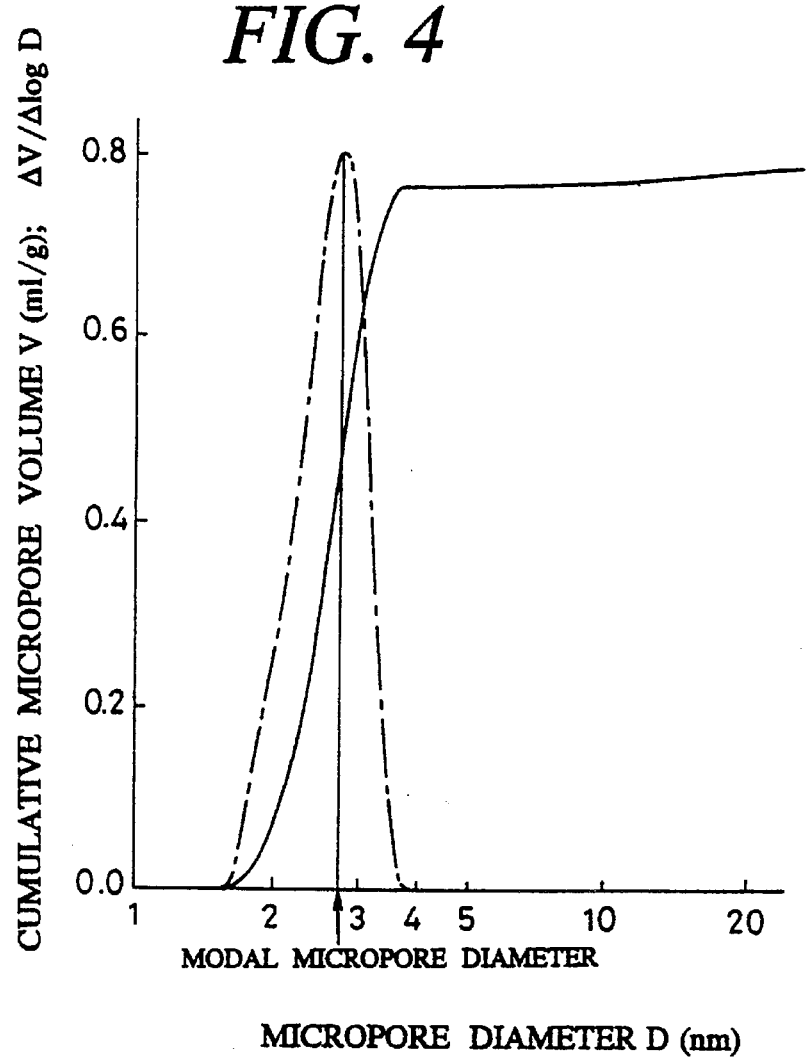
FIG. 4 is a graph showing the cumulative micropore volume as well as the micropore diameter distribution of the activated carbon fibers "FT-25"
Figure 5:
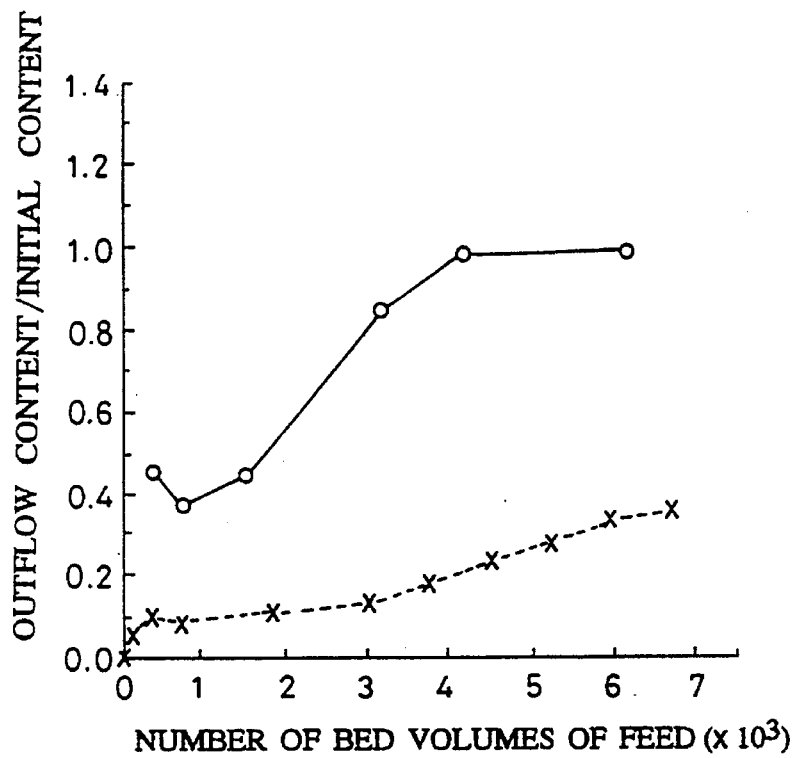
FIGS. 5 and 6 are graphs showing the results of Example 1, with the outflow rate of trihalomethanes and 2-MIB being plotted, respectively.
Figure 6:
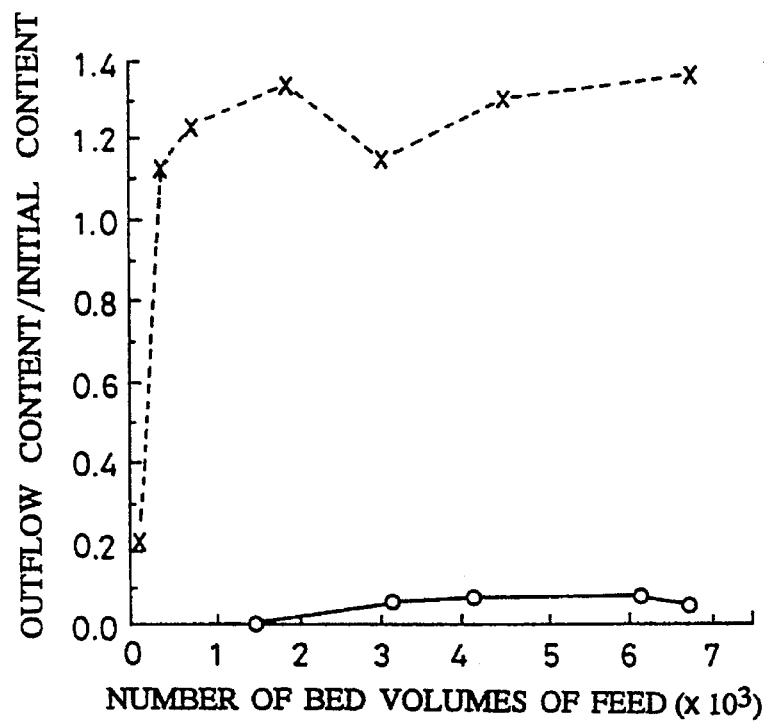

200 g, respectively, of the activated carbon fibers "A-10" (having a modal micropore diameter, as measured by the steam adsorption method, of 1.65 nm) and "A-20" (modal micropore diameter of 2.73 nm) of Osaka Gas Co., Ltd. were charged at a loading density of 0.15 g/ml in different vessels of a volume of 1,335 ml and the water to be treated was passed therethrough while measuring the content of trihalomethanes and 2-MIB contained in water flowing out of the vessels. Water to be treated was prepared from tap water of Kita-Kyushu City to which 2-MIB was added until the 2-MIB content equaled 100 ng/l. Trihalomethanes were not added so that only those which were initially contained in tap water were present. The results of measurement are shown in the graphs of FIGS. 5 and 6. In these graphs, the ordinate indicates, respectively, the outflow content of trihalomethanes and 2-MIB per initial content and, therefore, represents the adsorption capability of the activated carbon fibers for trihalomethanes and 2-MIB, respectively. The abscissa indicates the number of bed volumes of feed for activated carbon fibers, which is defined as being the integrated volume of treated water as divided by the bed volume of activated carbon fibers. The graph of FIG. 5 shows the outflow rate of total trihalomethanes (the total amount of chloroform, bromodichloromethane and other trihalomethane compounds) and the graph of FIG. 6 illustrates the outflow rate of 2-MIB.

The graph of FIG. 6 indicates that the activated carbon fibers "A-20" (line linking circles: -O-) having a modal micropore diameter of 2.73 nm are capable of adsorbing 2-MIB fairly well but the activated carbon fibers "A-10" (line linking "X"'s: -X-) having a modal micropore diameter of 1.65 nm are not effective at all in the adsorption of 2-MIB.

On the other hand, the graph of FIG. 5 indicates that, for the purpose of adsorption of trihalomethanes, the activated carbon fibers "A-10" (line linking "X"s: -X-) of a modal micropore diameter of 1.65 nm are far more suitable than the activated carbon fibers "A-20" (line linking circles: -O-) of a modal micropore diameter of 2.73 nm. It will be noted, however, that the activated carbon fibers "A-20" having a larger modal micropore diameter are yet capable of adsorbing trihalomethanes to a certain degree, as long as the number of bed volumes of feed or the integrated volume of treated water is small.

It will be understood from the foregoing that, although the activated carbon fibers "A-20" having a modal micropore diameter of 2.73 nm are well suited to the adsorption of 2-MIB, the adsorption capability thereof for trihalomethanes is nonetheless non-negligible to the extent that they are yet capable of adsorbing a small amount of trihalomethanes.

EXAMPLE 2

This Example demonstrates that, in the activated carbon fibers "A-20" having a modal micropore diameter of 2.73 nm, the adsorption capability with respect to trihalomethanes is eligible for regeneration.

40 g of the activated carbon fibers "A-20" was charged at a loading density of 0.15 g/ml in a vessel having a volume of 269 ml. Water to be treated prepared in the same manner as Example 1 was fed across the vessel and the outflow content of trihalomethanes and 2-MIB was measured while the activated carbon fibers were subjected to regeneration by boiling for 30 minutes for every 150 litters of water feed which corresponded to the number of bed volumes of feed of 558 times. For comparison, water was passed without subjecting the activated carbon fibers to regeneration and the outflow content was similarly monitored. The results are shown in the graphs of FIGS. 7 and 8.

Figure 7:
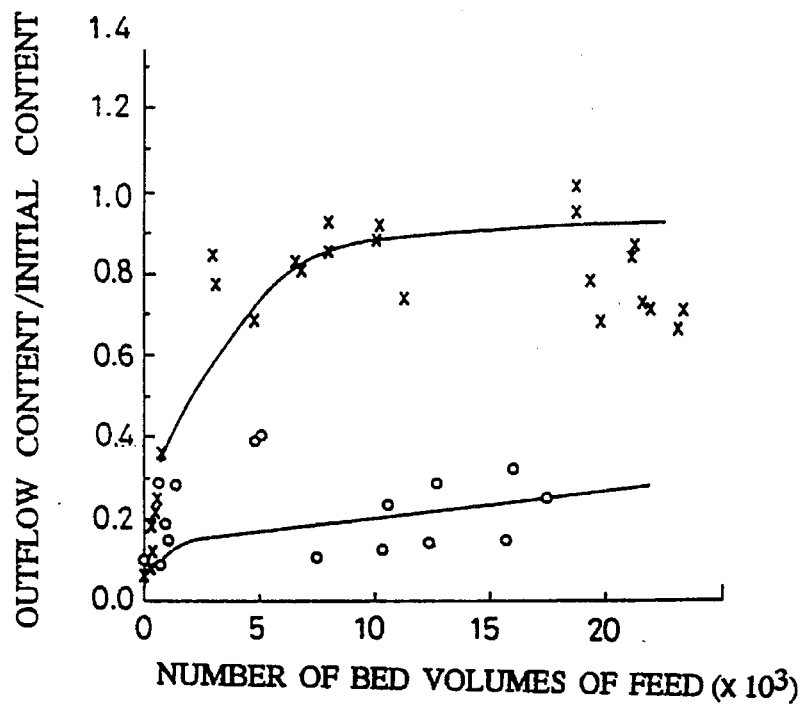
FIGS. 7 and 8 are graphs showing the results of Example 2, with the outflow rate of trihalomethanes and 2-MIB being plotted, respectively.
Figure 8:
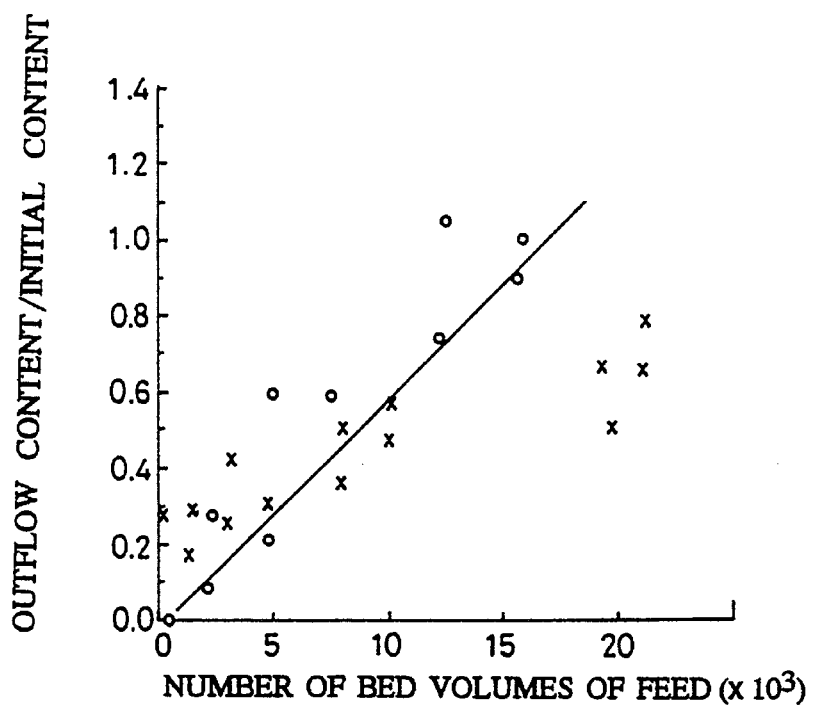

It will be understood from the graph of FIG. 7 that, when the activated carbon fibers "A-20" having a modal micropore diameter of 2.73 nm are used while subjecting them to repeated boiling ("O"), the adsorption capability for trihalomethanes can be sustained for a longer period as compared with the case wherein the activated carbon fibers are not subjected to boiling ("X"). Believably, this is because, due to boiling, trihalomethanes are purged from the activated carbon fibers so that the activated carbon fibers are regenerated to restore the adsorption capability for trihalomethanes. In contrast, as will be apparent from the graph of FIG. 8, the effect of regeneration by boiling ("O") is not appreciable with regard to the adsorption capability for 2-MIB.

The following Examples are related to the embodiments of the invention.

EXAMPLE 3

Experiments were carried out for a longer period by increasing the frequency and duration of regeneration as compared with Example 2. Water to be treated was prepared from tap water of Chigasaki City to which 2-MIB and chloroform were added such that the content of 2-MIB and trihalomethanes were equal to 100 ng/l and 100 µg/l, respectively. As activated carbon fibers, the activated carbon fibers "FT-25" of Kuraray Chemical Co., Ltd. were used which had a modal micropore diameter, as measured by the steam adsorption method, of 2.64 nm. 6.7 g of the activated carbon fibers "FT-25" was charged in a vessel of 45 ml at a loading density of 0.15 g/ml and the outflow rate (in %) of trihalomethanes and 2-MIB was measured while regenerating the activated carbon fibers by boiling for 80 minutes for every 12 litters of feed (corresponding to the number of bed volumes of feed of 266 times). The results are shown in the graphs of FIGS. 9 and 10.

Figure 9:
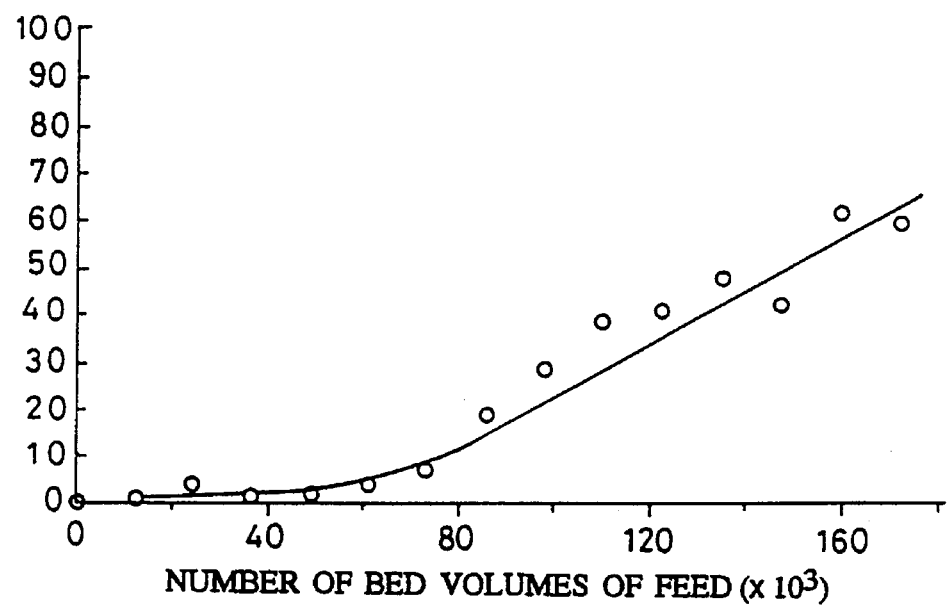
FIGS. 9 and 10 are graphs showing the results of Example 3, with the outflow rate of trihalomethanes and 2-MIB being plotted, respectively.
Figure 10:
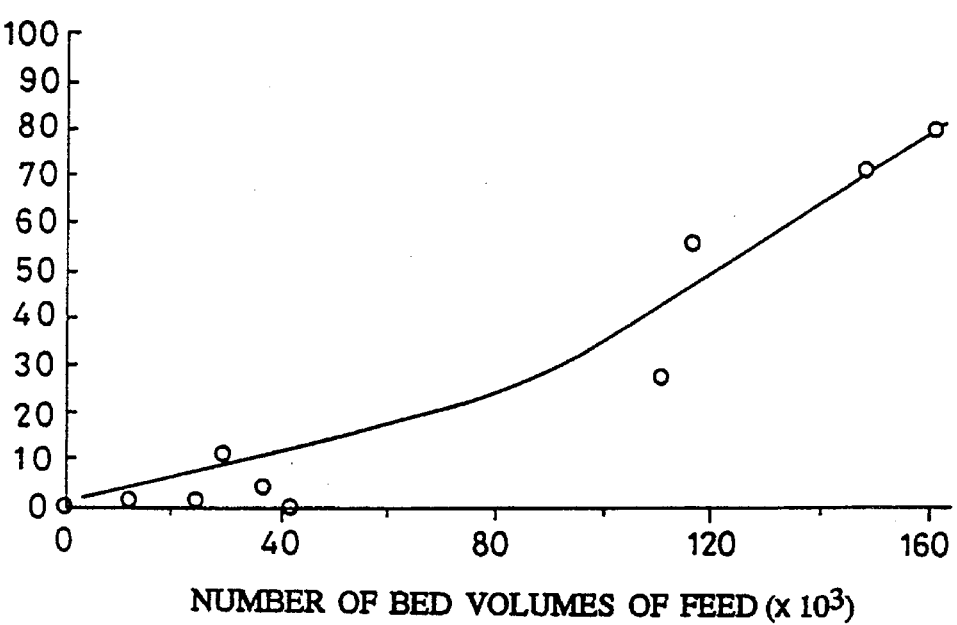

As will be understood from the graphs of FIGS. 9 and 10, it was possible to effectively remove trihalomethanes and 2-MIB for a satisfactorily long period sufficient for practical applications.

EXAMPLE 4

Figure 11:
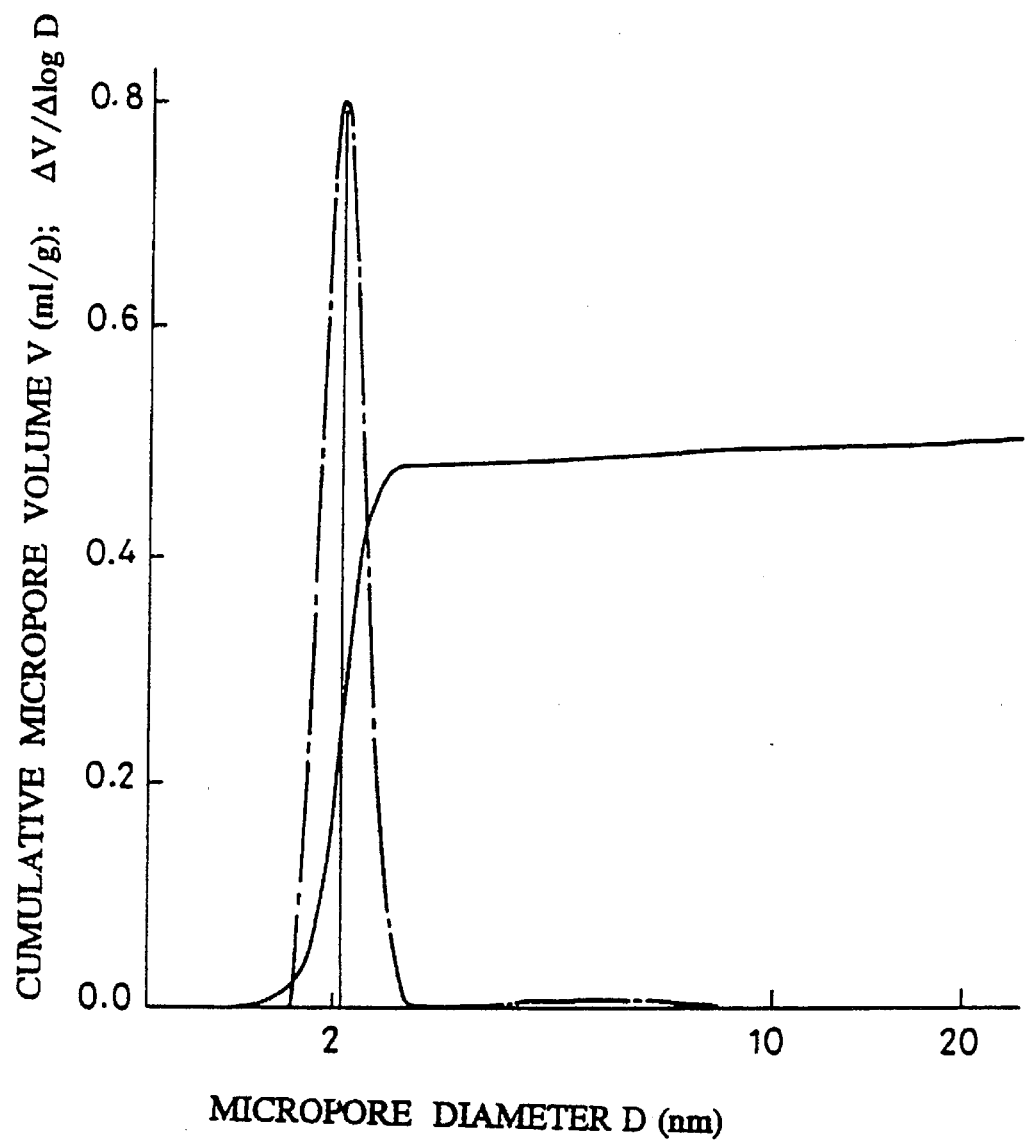
FIG. 11 is a graph showing the cumulative micropore volume and the micropore diameter distribution of the activated carbon fibers used in Example 4.
Figure 12:
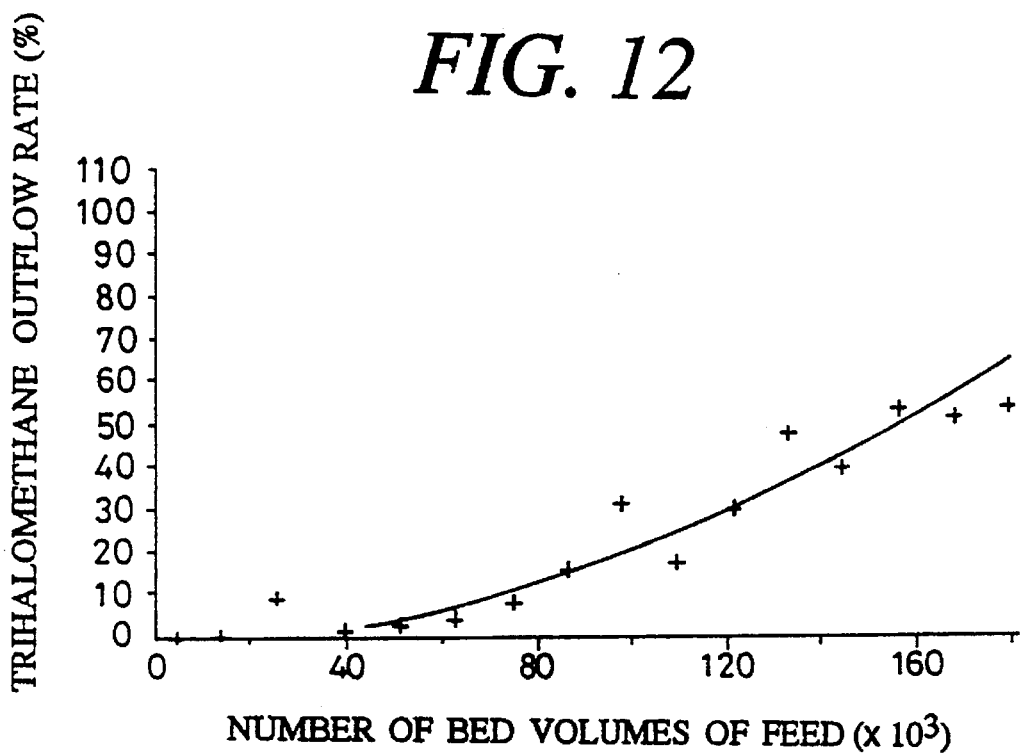
FIGS. 12 and 13 are graphs showing the results of Example 4, with the outflow rate of trihalomethanes and 2-MIB being plotted, respectively.
Figure 13:
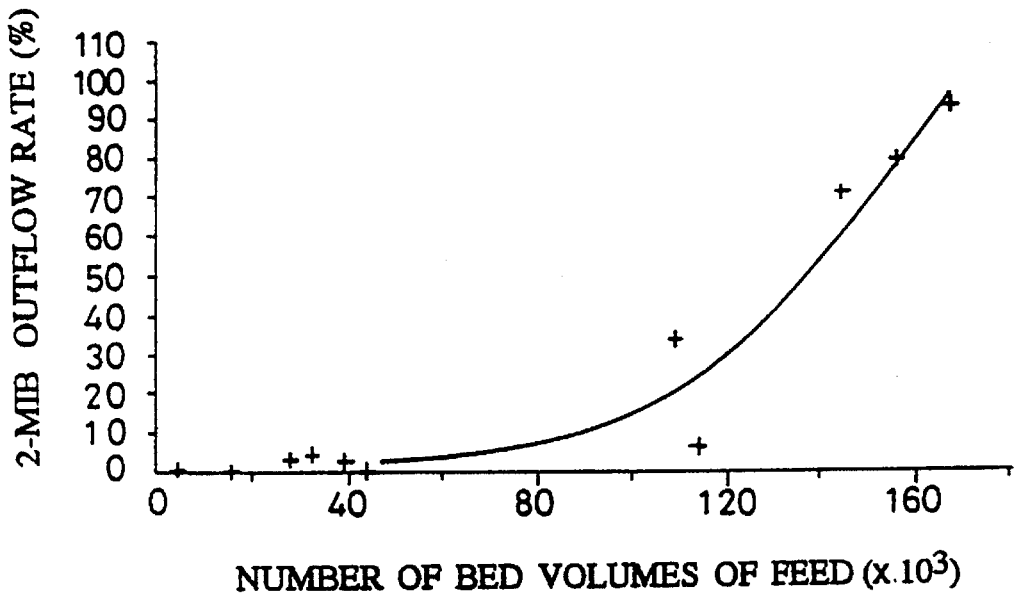

Experiments were conducted in the similar condition as Example 3, except that the activated carbon fibers "FT-20" of Kuraray Chemical Co., Ltd. were used. The cumulative micropore volume and the micropore diameter distribution of the activated carbon fibers "FT-20" are shown in the graph of FIG. 11. As will be noted from the graph of FIG. 11, the activated carbon fibers "FT-20" have a modal micropore diameter, as measured by the steam adsorption method, of 2.06 nm. The outflow rate of trihalomethanes and 2-MIB are shown in the graphs of FIGS. 12 and 13. As will be apparent from these graphs, with the activated carbon fibers "FT-20" having a modal micropore diameter of 2.06 nm, it was also possible to effectively eliminate trihalomethanes and 2-MIB similarly to the activated carbon fibers "FT-25".

Figure 14:
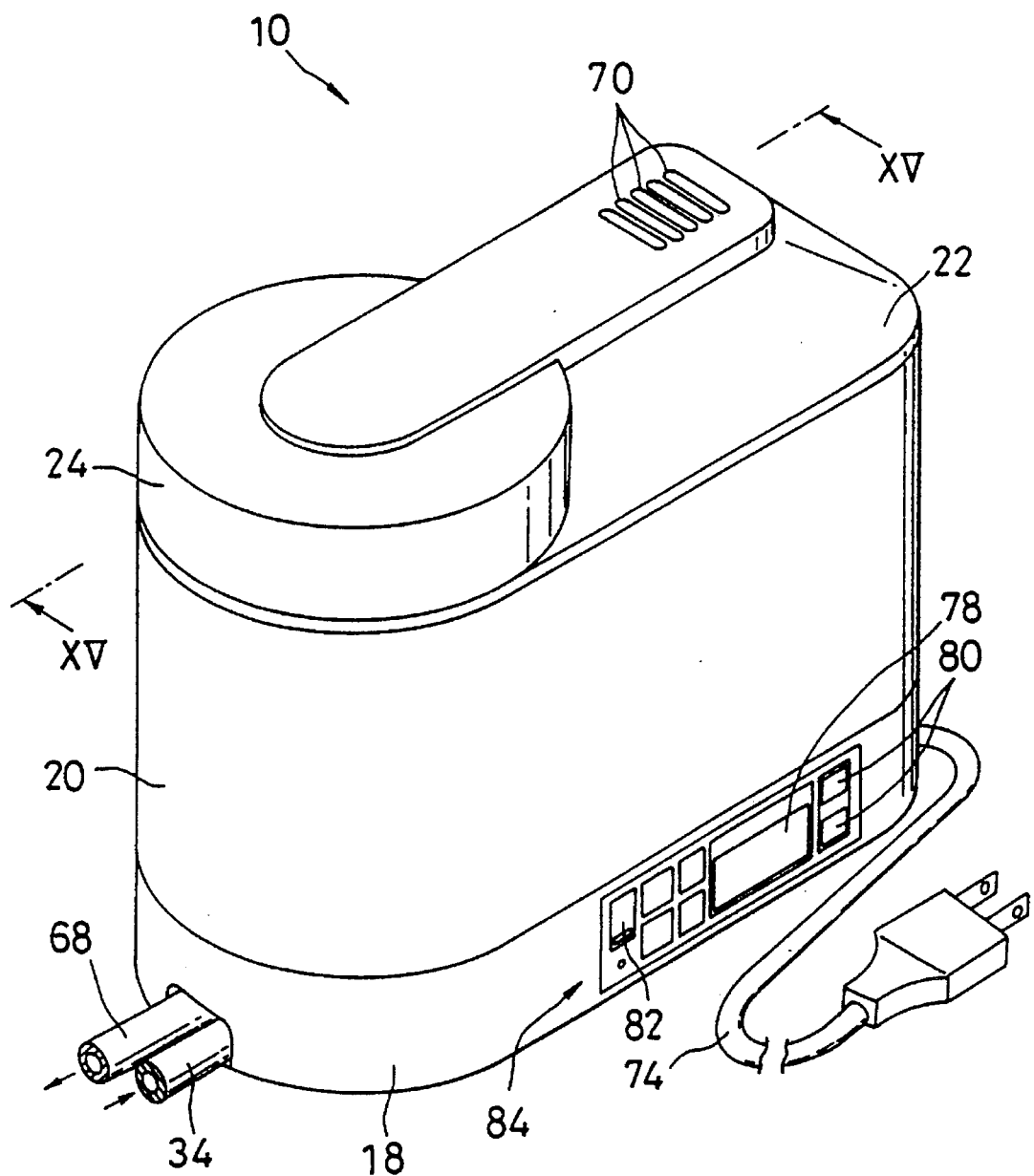
FIG. 14 is a perspective view of the water purifier according to the invention.
Figure 15:
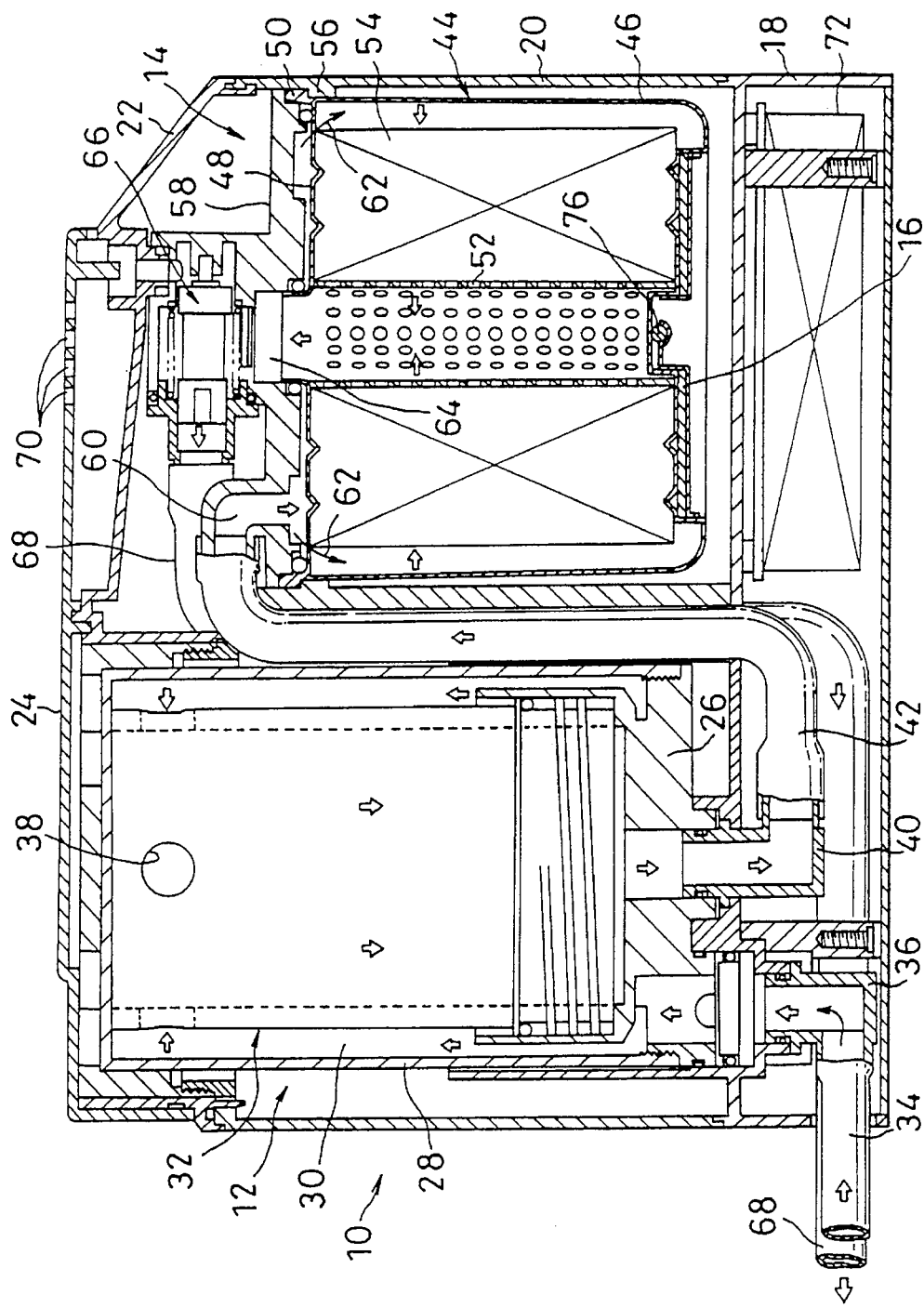
FIG. 15 is a cross-sectional view taken along the line XV—XV of FIG. 14.

Referring to FIGS. 14 and 15, a preferred embodiment of the water purifier according to the invention will be described below. Generally, the water purifier 10 of the illustrated embodiment comprises a filtration stage 12 for removing by filtration any particulate components such as ferrous rust and microorganism carried by tap water and an adsorption stage 14 for eliminating by adsorption by activated carbon fibers those harmful or undesirable substances such as chlorine, trihalomethanes and smelly substances (in particular, 2-MIB and geosmin) dissolved in tap water, the adsorption stage 14 being adapted to be periodically heated by an electric heater 16.

More specifically, the water purifier 10 includes a base 18, a central housing 20 secured to the base, an upper housing 22 snap-fitted to the central housing, and a cap 24 placed on the upper housing. A lower casing 26 fixed to the base 18 and an upper casing 28 fluid-tightly screwed to the lower casing together make up a filtration chamber 30 in which a conventional filter module 32 of hollow fiber membrane is replaceably arranged. Other type of filter may be used in place of the hollow fiber membrane filter module 32. Tap water to be purified is fed to the filtration chamber 30 via an inlet hose 34 and an inlet swivel coupling 36 to enter inside of the filter module 32 through a plurality of openings 38 thereof and the flow of water filtered by the hollow fiber membrane is delivered to the adsorption stage 14 via an outlet swivel coupling 40 and a hose 42.

In the adsorption stage 14, there is provided a processing vessel 44 in the form of a replaceable cartridge wherein activated carbon fibers are received. The activated carbon fiber cartridge 44 comprises a cylindrical bottomed container 46 made by deep drawing of a stainless sheet steel and an annular lid 48 of stainless sheet steel, which are hermetically sealed with each other by curring along the circumferential periphery 50 thereof. The lid 48 is provided with a plurality of arcuated slits, not shown, to ensure that water coming from the hose 42 flows into the cartridge 44. At the center of the cartridge 44, a perforated tube 52 of stainless steel is arranged, around which non-woven fabric of activated carbon fibers 54 is wound and retained at a loading density of about 0.15 g/ml. Instead, the activated carbon fibers 54 may be formed by molding with a binder. In order to make the activated carbon fiber cartridge 44 as small in size as possible while retaining the adsorption capability thereof with respect to the smelly substances (2-MIB and geosmin) over a period of 4–7 years, it is desirable that activated carbon fibers 54 having a modal micropore diameter, as measured by the steam adsorption method, of about 2.0–2.7 nm are primarily used. However, in situations where some increase in the size of the cartridge 44 is permissible, a small amount of activated carbon fibers having smaller or larger modal micropore diameter may be employed in combination.

When used in conditions wherein the quality of water to be processed is of an average level, the cartridge 44 is preferably charged with about 70 g of activated carbon fibers. In this regard, it will be noted from the graphs of FIGS. 9 and 10 showing the results of Example 3 that the outflow rate of both trihalomethanes and 2-MIB can successfully be limited to 30% until the number of bed volumes of feed becomes 90,000 times. Assuming that the volume of water to be treated per day is 15 liters, the integrated volume of water for 7 years will be:

15 (liters)×365 (days)×7 (years)=38,300 (liters)

For this volume to be 90,000 times, the required bed volumes of activated carbon fibers is:

38,300/90,000=0.426 (liters)=426 (ml)

As the loading density of activated carbon fibers is 0.15 g/ml, the weight of activated carbon fibers is:

426×0.15=64 (g)

Similarly, 37 g of activated carbon fibers will be required for 4 years of use. It will therefore be apparent that about 40–70 g of activated carbon fibers is sufficient for use over 4–7 years.

The activated carbon fiber cartridge 44 is supported by an annular support 56 of the central housing 20 and is closed by an upper lid 58 serving as a manifold. The manifold 58 is provided with an inlet 60 so that the flow of water filtered by the filtration stage 12 and incoming from the hose 42 is permitted to pass through the inlet 60 of the manifold 58 and through the slits in the lid 48 to flow into the cartridge 44 as shown by the arrows 62 thereby to fill the plenum situated around the activated carbon fibers 54. Water flows therefrom radially inwardly to pass across the activated carbon fibers 54 whereupon chlorine, trihalomethanes and smelly substances dissolved in water are adsorbed by the activated carbon fibers. Water as treated flows across the perforated tube 52 for recovery therein and is delivered through an outlet 64 of the manifold 58 to a thermostatic valve 66. The thermostatic valve 66 incorporates thermally expansive wax and is designed to communicate the outlet 64 of the manifold 58 with an outlet hose 68 when the temperature is lower than, say, 80° C. but to connect the outlet 64 with steam discharge openings 70 in the cap 24 when the temperature exceeds 80° C.

The electric heater 16 is held in thermal contact with the reverse side of the bottom of the container 46 of the activated carbon fiber cartridge 44 and is adapted to heat the cartridge 44 upon energization. The heater 16 may be the conventional one having nichrome wire interleaved between mica sheets. The heater 16 is controlled by a control circuit 72 which is disposed in the base 18 and to which electric power is supplied through an electric cable 74. The control circuit 72 may be programmed such that the heater 16 is timer-operated every day automatically at a predetermined time in the night, for example. Also held in thermal contact with the reverse side of the bottom of the container 46 is a temperature sensing element such as a thermistor 76 for monitoring the temperature of the bottom of the container 46. As best shown in FIG. 15, the central part of the container 46 is raised and the thermistor 76 is in contact with the raised central portion. The output of the thermistor 76 is delivered to the control circuit 72. As shown in FIG. 14, the base 18 of the water purifier 10 is provided with a control and display section 84 having a liquid crystal display panel 78, a switch 80 for setting the regeneration time and a manual switch 82 for triggering regeneration.

Figure 16:
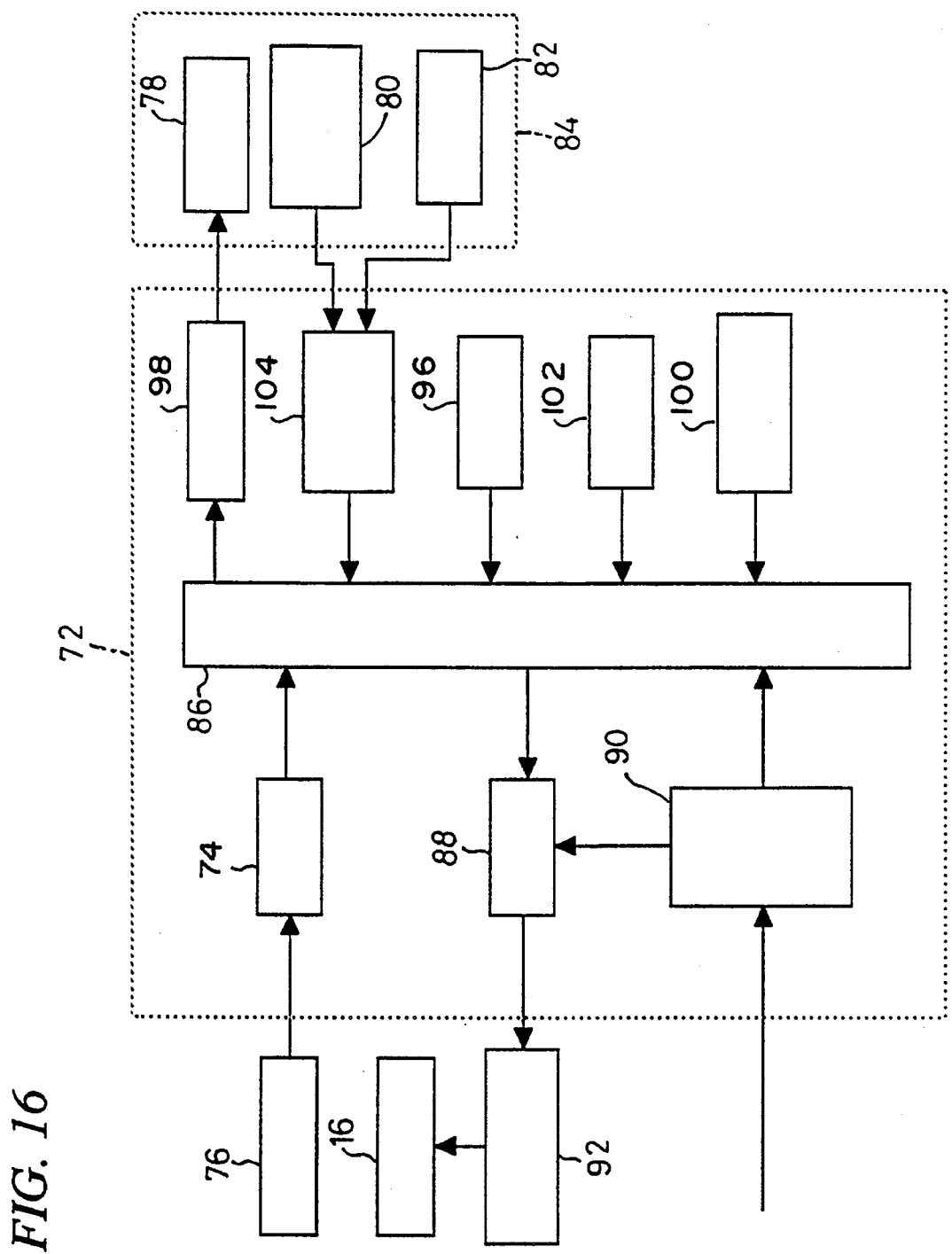
FIG. 16 is a block diagram showing the control circuit of the water purifier shown in FIGS. 14 and 15; and, FIG. 17 is a flow chart showing the operation of the control circuit.

FIG. 16 illustrates by way of an example the arrangement of the control circuit 72. The output of the thermistor 76 is input into the control circuit 72 which is connected to the display panel 78 and switches 80 and 82 of the control and display section 84. In the illustrated embodiment, the control circuit 72 comprises a programmed microprocessor 86 which is adapted to control electric power supply to the heater 16 through a solid state relay (SSR) 88. An alternating current (AC 100 V) output of a power source circuit 90 is fed to the heater 16 via the SSR 88 and a temperature fuse 92. The microprocessor receives power (+5 V) from power supply 90 or from backup circuit 100.

The microprocessor 86 may be programmed such that, upon arrival of the preset time (preferably, a time in the midnight), the heater 16 is operated every day automatically. The user may press on the regeneration time setting switch 80 to increment or decrement the regeneration time, for example, on the hourly basis, through switch input circuit 104. The microprocessor 86 may also be programmed so that electric power is supplied to the heater 16 whenever the user presses on the manual switch 82. Once power supply to the heater 16 is commenced, the microprocessor 86 monitors the output from the thermistor 76, received through input circuit 94, to detect the temperature of the raised bottom portion of the activated carbon fiber container 46 and controls the SSR 88 in accordance with the detected temperature in the manner described later. The microprocessor 86 is also provided with a reset circuit 102.

When used domestically, the water purifier 10 may be placed on a counter in a kitchen or in a space underneath a sink. Then the inlet hose 34 is connected to tap water supply line, with the outlet hose 68 connected to a faucet. In use, tap water from the supply line is first pretreated by the action of filter 32 in the filtration stage 12 and is then purified by the chemical and physical adsorption actions of the activated carbon fibers 54 in the adsorption stage 14. Water as purified may be served as potable water or may be used for cooking purposes.

Figure 17:
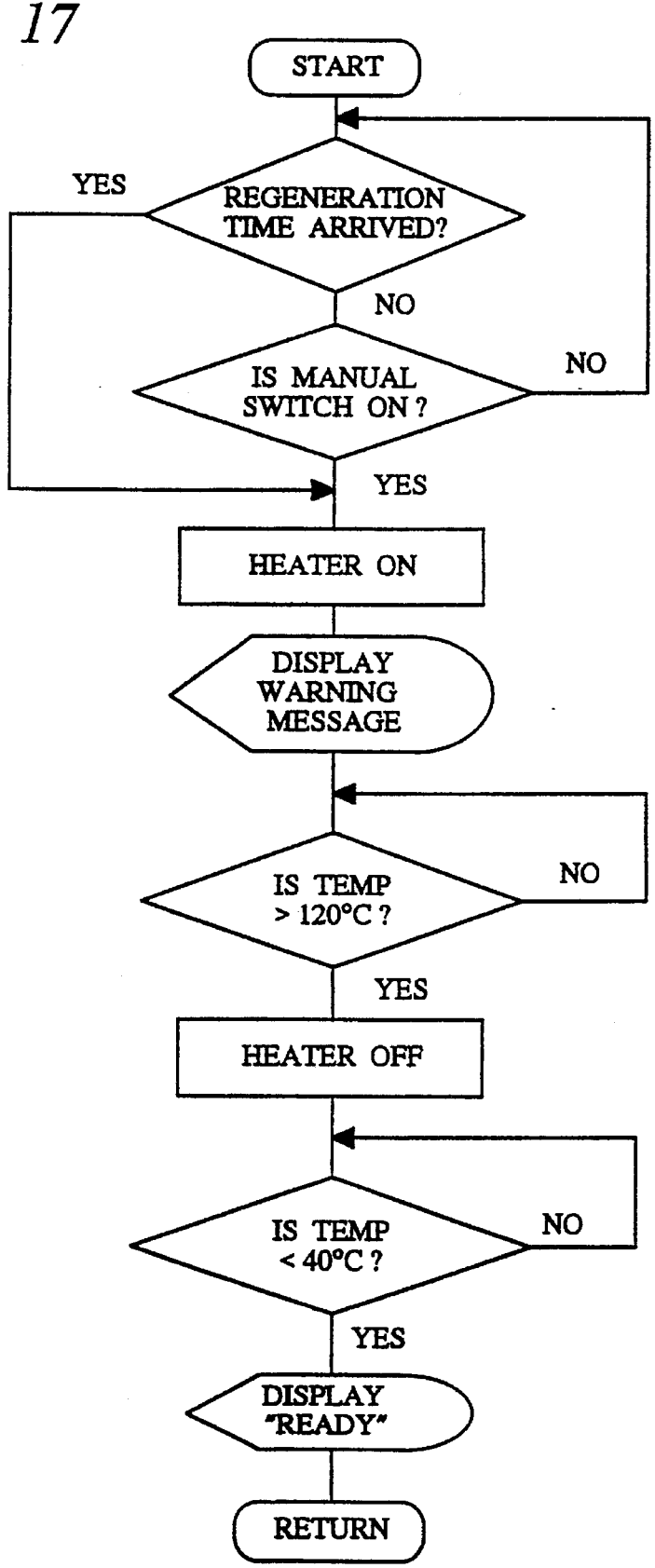

The mode of regeneration of the activated carbon fibers 54 will be described next with reference to the flowchart of FIG. 17. As the preset time arrives, as determined by clock 96, or the manual switch 82 pressed, the microprocessor 86 energizes the SSR 88 to commence power supply to the heater 16. At the same time, a warning message reading "under regeneration" or "under preparation" is displayed on the liquid crystal display panel 78, through driver 98, to preclude the user from inadvertently using the water purifier.

As the heater 16 is energized, the bottom of the activated carbon fiber container 46 is heated so that water in the container 46 is heated and will begin to boil. Generated steam rises through the outlet 64 of the manifold 58 toward the thermostatic valve 66. As the temperature of the thermostatic valve 66 exceeds 80° C., the valve 66 shifts to the left as viewed in FIG. 15 to permit steam to be discharged through the discharge openings 70 into the atmosphere.

As water in the container 46 comes to the boil, the activated carbon fibers 54 are sterilized by boiling and chlorine as well as trihalomethanes having a boiling point lower than that of water are readily desorbed from the activated carbon fibers under the action of hot water and steam whereby the activated carbon fibers are regenerated.

Power supply to the heater 16 is continued until the temperature of the raised bottom of the container 46 as detected by the thermistor 76 exceeds 120° C. The water level in the container 46 will be lowered as water therein evaporates. However, as the central portion of the bottom of the container 46 is raised, this portion will emerge first as evaporation and lowering of water level proceed so that the temperature of the raised portion is raised earlier than other portions. Accordingly, when the temperature of the raised bottom of the container 46 as detected by the thermistor 76 equals 120° C., a small amount of water remains in the bottom of the container 46. Therefore, by terminating power supply to the heater 16 upon sensing by the thermistor 76 a temperature of 120° C., it is possible to avoid overheating of the activated carbon fibers and to prevent burning and thermal degradation of activated carbon fibers.

When the temperature of the raised bottom of the container 46 becomes higher than 120° C., the microprocessor 86 terminates power supply to the heater 16. As the activated carbon fiber cartridge 44 is cooled by heat radiation so that the ambient temperature of the thermostatic valve 66 become lower than 80° C., the valve 66 connects the outlet 64 of the manifold 58 to the hose 68 so as to bring the water purifier ready for subsequent use. As the container 46 is further cooled and upon detection that the temperature of the raised bottom of the container as sensed by the thermistor 76 equals 40° C., the microprocessor 86, through driver 98, causes the display panel 78 to display a message reading "ready for use" or "ready" to tell the user that the water purifier is in an serviceable condition.

In this manner, according to the invention, activated carbon fibers having a modal micropore diameter of about 1.8–3.0 nm are used so as to center the target of adsorption on those substances, such as 2-MIB and geosmin, which have a large molecular weight and a high boiling point (207°–254° C.) as compared with trihalomethanes and which are therefore difficult to desorb by usual boiling under the atmospheric pressure. Accordingly, an adequate adsorption capacity (micropore volume) for these substances is reserved from the outset in the activated carbon fibers so as to enable the activated carbon fibers to selectively adsorb these substances for a long period. In addition, the adsorption capability for trihalomethanes is similarly maintained throughout a long period by repeated regeneration of activated carbon fibers resulting from boiling and heating. As in this manner the benefits of the adsorption capability afforded by the activated carbon fibers according to the invention to selectively adsorb a large amount of larger molecular weight substances as well as to temporarily adsorb trihalomethanes are fully utilized, both trihalomethanes and smelly substances can be effectively removed with a limited amount of activated carbon fibers for a prolonged period so that the service life of activated carbon fibers is remarkably extended. According to the invention, the service life of activated carbon fibers may be extended to 4–7 years, in contrast to the prior art wherein the activated carbon fibers must be replaced for every six months or every year.

Furthermore, as in this manner the service life of activated carbon fibers for both trihalomethanes and smelly substances is prolonged, the water purifier may be made small and compact or the running cost required for water treatment may be considerably reduced.

While the present invention has been described herein with reference to the specific embodiments thereof, it is contemplated that the invention is not limited thereby and various modifications and alterations may be made therein without departing from the scope of the invention. In particular, it should be understood that the invention does not exclude use of small amount of activated carbon fibers having a larger or smaller modal micropore diameter or use of granular activated charcoal, in addition to the activated carbon fibers having a modal micropore diameter of about 1.8–3.0 nm. Further, the filtration stage 12 with a filter 32 is not essential for the purpose of the invention and may be omitted. Moreover, although steam generated during regeneration of activated carbon fibers is described as being discharged into the atmosphere through the steam discharge openings 70 of the water purifier, it may be discharged via drainage pipings to a sink or trap.

We claim:

1. A process for purifying tap water comprising:

contacting the tap water with activated carbon fibers having a modal micropore diameter, measured by a steam adsorption method, of about 1.8–3.0 nm to cause said fibers to adsorb, from the tap water, a harmful first substance having a boiling point lower than the boiling point of water and a smelly second substance having a boiling point higher than the boiling point of water, so that said first and second substances present in the tap water prior to said contacting are removed therefrom; and, heating said activated carbon fibers having the thus adsorbed said substances at a temperature higher than the boiling point of said first substance and lower than the boiling point of said second substance thereby causing said fibers to desorb said first substance whereby said activated carbon fibers are regenerated to selectively restore the adsorption capability thereof with respect to said first substance while retaining adsorbed therein the second substance.

2. A process for purifying tap water according to claim 1, wherein, in the step of heating, said activated carbon fibers are heated at a temperature of 100°–120° C.

3. A process for purifying tap water according to claim 2, wherein said activated carbon fibers have a modal micropore diameter of about 2.0–2.7 nm.

4. A process for purifying tap water according to claim 2, wherein tap water is subjected to filtration prior to contact with said activated carbon fibers.

5. A process for purifying tap water according to claim 1, wherein said activated carbon fibers have a modal micropore diameter of about 2.0–2.7 nm.

6. A process for purifying tap water according to claim 5, wherein tap water is subjected to filtration prior to contact with said activated carbon fibers.

7. A process for purifying tap water according to claim 1, wherein tap water is subjected to filtration prior to contact with said activated carbon fibers.

8. A process for purifying tap water comprising:
contacting the tap water with-activated carbon fibers having a modal micropore diameter, measured by a steam adsorption method, of about 1.8–3.0 nm to cause said fibers to adsorb, from the tap water, an organic chlorine compound having a boiling point lower than the boiling point of water and a smelly substance, originating from micro-organisms and having a boiling point higher than the boiling point of water, so that said compound and substance present in the tap water prior to said contacting are removed therefrom; and, heating the activated carbon fibers at a temperature higher than the boiling point of water and lower than the boiling point of said smelly substance thereby causing said fibers to selectively desorb said organic chlorine compound whereby said activated carbon fibers are regenerated to restore the adsorption capability thereof with respect to said organic chlorine compound, while retaining the adsorbed smelly substance.

9. A process for purifying tap water according to claim 8, wherein, in the step of heating, said activated carbon fibers are heated at a temperature of 100°–120° C.

10. A process for purifying tap water according to claim 8, wherein said activated carbon fibers have a modal micropore diameter of about 2.0–2.7 nm.

11. A process for purifying tap water according to claim 8, wherein tap water is subjected to filtration prior to contact with said activated carbon fibers.

12. A process for purifying tap water comprising:
contacting the tap water, containing a smelly organic substance and a trihalomethane compound, with activated carbon fibers having such a modal micropore diameter for selectively adsorbing, from the tap water, said smelly organic substance which has a boiling point higher than the boiling point of water and which has a molecular weight of about 160–190 to thereby cause said fibers to selectively adsorb said organic substance as well as to temporarily adsorb said trihalomethane compound so as to remove said organic substance and said trihalomethane compound from the tap water; and, heating the activated carbon fibers having the thus adsorbed said organic substance and said trihalomethane compound at a temperature higher than the boiling point of water and lower than the boiling point of said organic substance thereby causing said fibers to desorb said trihalomethane compound, whereby said activated carbon fibers are regenerated to selectively restore the adsorption capability thereof with respect to said trihalomethane compound while retaining adsorbed therein the organic substance.

13. A process for purifying tap water according to claim 12, wherein, in the step of heating, said activated carbon fibers are heated at a temperature of 100°–120° C.

14. A process for purifying tap water according to claim 12, wherein said activated carbon fibers have a modal micropore diameter of about 2.0–2.7 nm.

15. A process for purifying tap water according to claim 12, wherein tap water is subjected to filtration prior to contact with said activated carbon fibers.

16. A process for purifying tap water comprising:
contacting the tap water with activated carbon fibers having a modal micropore diameter, measured by a steam adsorption method, of about 2.0–2.7 nm to cause said fibers to adsorb, from the tap water, a harmful first substance having a boiling point lower than the boiling point of water and a smelly second substance having a boiling point higher than the boiling point of water, so that said first and second substances present in the tap water prior to said contacting are removed therefrom; and, heating said activated carbon fibers having the thus adsorbed said substances at a temperature higher than the boiling point of said first substance and lower than the boiling point of said second substance thereby causing said fibers to desorb said first substance adsorbed therein whereby said activated carbon fibers are regenerated to selectively restore the adsorption capability thereof with respect to said first substance while retaining adsorbed therein the second substance.

* * * * *

UNITED STATES PATENT AND TRADEMARK OFFICE
CERTIFICATE OF CORRECTION

PATENT NO. : 5,607,595

DATED : March 4, 1997

INVENTOR(S) : HIASA et al

Page 1 of 2

It is certified that error appears in the above-indentified patent and that said Letters Patent is hereby corrected as shown below:

Col. 3, line 14, delete "a"; and line 15, delete "a".

Col. 4, line 15, delete "toward" and insert --on--

Col. 9, line 62, "Suc-" should read --suc- --.

Col. 12, line 4, after "causes" insert --, through driver 98,--

Col. 13, line 10, delete "2" and insert --1--;

line 13, delete "2" and insert --1--;

line 16, delete "1" insert --2--;

line 19, delete "5" insert --2--;

line 22, delete "1" insert --3--; and line 26, "with-activated" should read --with activated--.

UNITED STATES PATENT AND TRADEMARK OFFICE
CERTIFICATE OF CORRECTION

PATENT NO. : 5,607,595
DATED : March 4, 1997
INVENTOR(S) : HIASA et al

It is certified that error appears in the above-identified patent and that said Letters Patent is hereby corrected as shown below:

line 22, delete "1" insert --3--; and line 26, "with-activated" should read --with activated--.

Signed and Sealed this

Tenth Day of March, 1998

BRUCE LEHMAN

*Attest:*

*Attesting Officer*     Commissioner of Patents and Trademarks